United States Patent
Meeks et al.

(10) Patent No.: US 11,214,025 B2
(45) Date of Patent: Jan. 4, 2022

(54) FIBRE-REINFORCED COMPONENTS

(71) Applicant: McLaren Automotive Limited, Surrey (GB)

(72) Inventors: Graham Meeks, Surrey (GB); Claudio Santoni, Surrey (GB)

(73) Assignee: McLaren Automotive Limited, Woking (GB)

( * ) Notice: Subject to any disclaimer, the term of this patent is extended or adjusted under 35 U.S.C. 154(b) by 641 days.

(21) Appl. No.: 15/524,921

(22) PCT Filed: Nov. 9, 2015

(86) PCT No.: PCT/GB2015/053386
§ 371 (c)(1),
(2) Date: May 5, 2017

(87) PCT Pub. No.: WO2016/071719
PCT Pub. Date: May 12, 2016

(65) Prior Publication Data
US 2017/0320278 A1    Nov. 9, 2017

(30) Foreign Application Priority Data

Nov. 7, 2014    (GB) .................................... 1419902

(51) Int. Cl.
*B29C 70/86*    (2006.01)
*B29C 43/18*    (2006.01)
(Continued)

(52) U.S. Cl.
CPC .............. *B29C 70/86* (2013.01); *B29C 43/18* (2013.01); *B29C 45/14418* (2013.01);
(Continued)

(58) Field of Classification Search
CPC ... B29C 70/86; B29C 70/12; B29C 45/14786; B29C 45/14418; B29C 43/18;
(Continued)

(56) References Cited

U.S. PATENT DOCUMENTS 4,721,342 A      1/1988  Daniels et al.
6,821,613 B1 *  11/2004  Kagi .................... B29C 70/081
                                                                                 428/292.1
(Continued)

FOREIGN PATENT DOCUMENTS

DE      102012000772       7/2013
EP        2 772 416        9/2014
(Continued)

OTHER PUBLICATIONS

Search Report for App. Serial No. GB 1419902.0, dated Oct. 14, 2015, 4 pages.
(Continued)

*Primary Examiner* — Jacob T Minskey
*Assistant Examiner* — Virak Nguon
(74) *Attorney, Agent, or Firm* — Fish & Richardson P.C.

(57) ABSTRACT

A method for forming a composite component, comprising: locating a rigid composite element comprising a matrix interspersed with long fibre reinforcement in a mould that is shaped to define a cavity about the rigid element; loading a material comprising a matrix precursor interspersed with short fibre reinforcement into the cavity; and curing the matrix precursor.

25 Claims, 4 Drawing Sheets

(51) Int. Cl.
   *B29C 45/14* (2006.01)
   *B29C 70/76* (2006.01)
   *B29C 70/08* (2006.01)
   *B29C 70/12* (2006.01)
   *B62D 29/04* (2006.01)

(52) U.S. Cl.
   CPC ...... *B29C 45/14786* (2013.01); *B29C 70/081* (2013.01); *B29C 70/12* (2013.01); *B29C 70/76* (2013.01); *B62D 29/046* (2013.01)

(58) Field of Classification Search
   CPC .... B29C 70/081; B62D 29/046; B62D 70/76; B62D 2827/12; D04H 13/00; D04H 3/00; B32B 27/12
   See application file for complete search history.

(56) References Cited

U.S. PATENT DOCUMENTS

| | | | |
|---|---|---|---|
| 2013/0052412 A1* | 2/2013 | Fox | B29C 43/02 428/139 |
| 2013/0249242 A1* | 9/2013 | Kimoto | B62D 29/046 296/181.2 |
| 2013/0323454 A1 | 12/2013 | Chapman et al. | |
| 2015/0217712 A1* | 8/2015 | Cowelchuk | B60R 21/215 280/728.3 |
| 2015/0268010 A1* | 9/2015 | Strauss | F41H 7/044 89/36.02 |
| 2017/0036624 A1* | 2/2017 | Yabu | B60R 19/03 |

FOREIGN PATENT DOCUMENTS

| | | |
|---|---|---|
| GB | 2 378 915 | 10/2003 |
| WO | WO 90/06226 | 6/1990 |
| WO | WO 99/52703 | 10/1999 |
| WO | WO 03/057529 | 7/2003 |
| WO | WO 2004/024424 | 3/2004 |
| WO | WO 2011/113912 | 9/2011 |
| WO | WO 2012/058345 | 5/2012 |

OTHER PUBLICATIONS

International Search Report and Written Opinion of the International Searching Authority for App. Serial No. PCT/GB2015/053386, dated Feb. 24, 2016, 13 pages.

Akiyama, "Development of PCM Technology", SPE ACCE, PowerPoint Presentation, 2011, 37 pages.

Krauss Maffei [online] "Fully automatic injection molding of thermoplastic composites," Sep. 20, 2012, retrieved on Mar. 31, 2020, retrieved from URL: http://www.kraussmaffei.de/en/press-releases/d/Fully_automatic_injection_molding_thermoplastic_composites.html, 6 pages.

* cited by examiner

FIBRE-REINFORCED COMPONENTS

CROSS-REFERENCE TO RELATED APPLICATIONS

This application is the National Stage of International Application Serial No. PCT/GB2015/053386, filed on Nov. 9, 2015, which claims the benefit of Application Serial No. GB 1419902.0, filed on Nov. 7, 2014.

This invention relates to fibre-reinforced components and methods of manufacturing such components.

It is known to manufacture components from fibre-reinforced composite (FRC) materials. Such materials typically comprise a matrix that contains reinforcing fibres. As an example, the matrix could be an epoxy resin and the fibres could be carbon fibre (CF) strands. Materials of this type can have good strength in comparison to their weight. However, the processes required to make components from fibre-reinforced materials can be complex.

One process for forming FRC components is resin transfer moulding (RTM). In this process the reinforcing fibres are laid up in a mould cavity, liquid resin is injected into the mould cavity and the resin is cured, typically by heating the mould body. Once the resin has become solid the mould can be opened and the resulting component removed. The resin can be injected by drawing a vacuum in the mould cavity and allowing the vacuum to pull the resin into the mould. The mould cavity can be defined by rigid mould tools, which has the advantage of giving good control over the dimensional accuracy and surface finish of the component. Furthermore, long fibre runs, and woven mats of fibres can be embedded in the matrix, giving the end component great strength. RTM can be used for major structural components, such as vehicle tubs, as described in EP 2 772 416. One disadvantage of RTM is that it is difficult to achieve complex shape detail with a good degree of strength in the moulded component because it is difficult to lay up long reinforcing fibres in complex or confined regions of the mould.

Another process for forming FRC components is to form a precursor which comprises a liquid resin mixed with short reinforcing fibres. The short fibres could be, for example, around 25 mm long. Such precursors are sometimes known as sheet moulding compound (SMC). The precursor is then injected into a mould cavity and the resin is cured to form a solid matrix which encapsulates the short fibres. The resulting component can then be removed from the mould. This flow moulding process is often used to form sheet parts of complex shapes. In comparison to the RTM process, the flow moulding process allows reinforcing fibres to be readily incorporated even into intricate regions of a moulded component. However, the strength of flow moulded components is considerably less than can be achieved with RTM components. For example, the tensile strength and modulus of an RTM component could be around 1000 MPa and 100 GPa respectively, whereas the corresponding values for a flow moulded component could be 200 MPa and 30 GPa. These differences arise because the reinforcing fibres in a flow moulded component are short; and because they are aligned randomly, or in dependence on the flow pattern of the precursor into the mould, rather than in accordance with the anticipated stresses on the structure.

There is a drive to reduce the mass of vehicle components, in order to improve vehicles' performance and energy efficiency. The considerable differences in strength between RTM and flow moulded components means that flow moulding is less desirable for producing major structural vehicle components such as tubs, engine supports or crash protection structures. To achieve adequate strength the flow moulded component would be much heavier than an analogous RTM component. However, forming such components using flow moulding would have the advantage that detailed structural elements could be formed integrally with the component rather than attached as a separate manufacturing stage. For illustration, a typical RTM vehicle tub is generally made up of a structure of flat-sided interconnected beams. To form a vehicle around such a structure requires attaching additional parts to the tub. Such parts might include a projecting rib onto which a door seal can be clipped, or a shaped flange surrounding a windscreen opening onto which a sheet of windscreen glass can be adhered. Conventionally those parts are manufactured and then glued or bolted to the tub.

It has been proposed that a load-carrying thermoplastic carbon-fibre-reinforced part manufactured from a composite sheet can have ribbing moulded onto it in the injection moulding process, along with other integration and function elements. (See http://www.kraussmaffei.de/en/press-releases/d/Fully_automatic_injection_molding_thermoplastic_composites.html). A continuous-fibre reinforced sheet blank can be impregnated with a matrix precursor and then thermoformed in a mould. Then further matrix material can be injected into parts of a mould volume to form additional features.

In another process an element made of a carbon fibre prepreg can be shaped and then positioned next to a carbon fibre SMC body in a mould. The mould can be closed to form the SMC blank to shape and press it against a sheet part of the prepreg body, and the prepreg and the SMC body can be cured. (See "Development of PCM Technology", Koichi Akiyama, SPE ACCE 2011).

There is a need for a manufacturing process that allows structural composite components to be formed with light weight and with flexibility to define intricate surface features.

According to one aspect of the present invention there is provided a method for forming a composite component, comprising: locating a rigid composite element comprising a matrix interspersed with long fibre reinforcement in a mould that is shaped to define a cavity about the rigid element; loading a material comprising a matrix precursor interspersed with short fibre reinforcement into the cavity; and curing the matrix precursor.

A first part of the mould may be shaped to fit to the contours of all or part of the rigid element. A second part of the mould may be shaped to define the cavity around the rigid element. The step of locating comprises closing the mould against the rigid element without substantially altering the shape of the rigid element. The closed mould may surround part or all of the rigid element.

The rigid element may be hollow in the region adjacent the cavity. The exterior of the rigid element may be defined by sheet structures in the region adjacent the cavity. The thickness of the sheet structures may be less than 10 mm, less than 7 mm or less than 5 mm.

The method may comprise, prior to the loading step, heating the mould to a temperature at which the matrix of the rigid element will soften.

The temperature to which the mould is heated may be between the glass transition temperature of the matrix of the rigid element and 20° C. above that temperature.

The step of closing the mould may comprise indenting the mould into the surface of the rigid element so as to seal the cavity.

The mould may comprise a first part of the mould and a second part of the mould, the first part of the mould may comprise a mould body and at least one mould slider moveable between an extended position and a retracted position relative to the mould body, and the step of locating may comprise closing the mould against the rigid element by: bringing the at least one mould slider, in the extended position, into contact with a second part of the mould, closing the first part of the mould and the second part of the mould around the rigid composite element so that the mould slider moves between the extended position and the retracted position.

The step of bringing the at least one mould slider into contact with a second part of the mould may comprise securing the rigid composite element in the second part of the mould by the at least one mould slider.

The rigid composite element may comprise at least one projection, the mould may be shaped to fit against the contours of the surfaces of the projection facing away from the cavity, and the step of locating may comprise locating at least one projection at an edge the cavity.

The rigid composite element may comprise at least one projection, the mould may be shaped to fit against the contours of the surfaces of the projection not facing the cavity, and the step of locating may comprise locating at least one projection at an edge the cavity. The mould may seal against at least one the projection to substantially inhibit flow of the matrix precursor out of the cavity. A first part of the mould may be shaped to fit to the contours of the rigid element and a second part of the mould may be shaped to define the cavity around the rigid element, and the step of locating may comprise locating at least one projection at an edge of the cavity of the second part of mould.

The projection may extend away from the exterior surface of the rigid composite element.

The method may comprise heating the said material to a temperature at which the matrix of the rigid element will soften.

The temperature to which the said material is heated may be between the glass transition temperature of the matrix of the rigid element and 20° C. above that temperature.

The method comprises heating the said material to the said temperature after or before loading it into the cavity.

The long fibre reinforcement may comprise fibres longer than 50 cm. The said material may comprise fibres shorter than 10 cm. The said material may comprise no fibres longer than 10 cm.

The method may comprise the step of forming the rigid composite element by resin transfer moulding.

The rigid composite element may be a tub for a vehicle. The cavity may be adjacent to a portion of the tub forming part of a crash structure. The cavity may, for example be adjacent to an A-pillar, B-pillar, C-pillar, cross-beam or sill of the tub. The material injected into the cavity may define a feature running lengthwise along such an element.

The material injected into the cavity may define a structural feature of the crash structure. The feature may be one of a flange for carrying a door seal and a flange for bonding glass to.

The method may comprise, prior to the step of loading, coating at least a part of the surface of the rigid element with an adhesive, that part of the surface being overlain by the cavity.

The adhesive may be applied as a peelable film.

According to a second aspect of the present invention there is provided a structural element of a vehicle including (a) a first composite element having a matrix interspersed with long comprising long reinforcing fibres and (b) a second composite element integral with a hollow region of the first composite element and having a matrix interspersed with short reinforcing fibres.

The long reinforcing fibres may comprise (or mainly comprise) fibres longer than 50 cm. The long reinforcing fibres may comprise no (or substantially no) fibres shorter than 50 cm, 20 cm or 10 cm. The short reinforcing fibres may comprise no (or substantially no) fibres longer than 50 cm, 20 cm or 10 cm. The short reinforcing fibres may comprise (or mainly comprise) fibres shorter than 10 cm.

The structural element may be part of a crash structure of the vehicle.

The first composite element may comprise at least one projection, and wherein the second composite element may abuts the at least one projection. The second composite element may be located to one side of a first protection and substantially no matrix interspersed with short reinforcing fibres may be located adjacent the other side of a first protection. The projection may extend away from the exterior surface of the first composite element.

According to a third aspect of the present invention there is provided a vehicle having an A-pillar, the A-pillar comprising: a rigid structural part defining a rear-facing surface and an interior sideways-facing surface; a windscreen attached to the front of the rigid structural part; and a cushioning cover layer adhered to the rear-facing surface and optionally to part of the interior sideways-facing surface, the cover layer being absent from the majority of the interior sideways-facing surface thereby exposing the rigid structural part over the remainder of the interior sideways-facing surface.

The cover layer may comprise a resilient sheet. The resilient sheet may comprise a foam and/or a rubber. The cover layer may comprise a cosmetic sheet on its exterior. The cosmetic sheet may comprise a textile or leather.

The cover layer may be absent from the majority of the front-most region of the interior sideways-facing surface, thereby permitting vision through at least part of the windscreen by an occupant of the vehicle at a wider angle than would be the case if the front-most region of the interior sideways-facing surface were entirely covered by the cover.

The rigid structural part may be a fibre-reinforced composite part.

The rigid composite element may be cured prior to being located against the short fibre material.

The present invention will be described by way of example with reference to the accompanying drawings. In the drawings.

In the examples described below a rigid vehicle tub is formed as a long-fibre composite element, for example by resin transfer moulding. Then the tub is transferred to another mould which accommodates all or part of the tub and defines one or more mould cavities adjacent to the outer surface of the tub. That second mould is shaped so as to conform to the exterior contours of part or all of the tub. That mould is sealed against the outer surface of the tub 11, and then a material comprising a fluid matrix precursor in which short reinforcing fibres have been dispersed loaded into the mould cavities. The matrix precursor is cured, leaving the material in the cavities adhered to the tub as overmoulded elements. The overmoulded elements could contribute substantially to the structural strength of the tub. Similar principles could be adopted for parts other than vehicle tubs.

Figure 1:
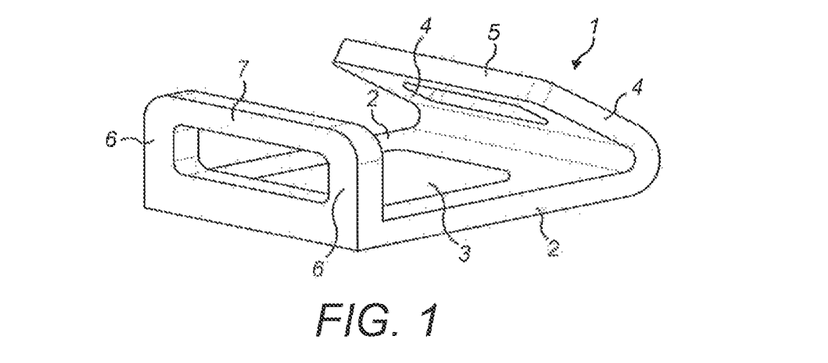
FIG. 1 shows a vehicle tub.

FIG. 1 shows a carbon fibre reinforced vehicle tub frame 1 formed by resin transfer moulding. The tub frame comprises side sills 2 which run along the sides of the tub. A floor 3 extends between the sills. At the front of the tub frame A-pillars 4 rise from the sills. The upper ends of the A-pillars are joined by a cross-member 5. At the rear of the tub frame C-pillars 6 rise from the sills. The C-pillars are joined by a cross-member 7. The sills, pillars and cross-members are formed as hollow tubes. This can be achieved by inflating a bladder within each tube during the RTM process. The RTM process involves laying up long fibre reinforcement in a mould, injecting a matrix precursor into the mould, curing the matrix precursor to form a rigid matrix around the reinforcing fibres and removing the resulting component from the mould. The RTM mould defines the exterior shape of the RTM component.

The walls forming the tub frame are formed of rigid, cured epoxy in which are embedded long runs of carbon fibre. The fibre could be in the form of tow, mats or individual fibres. The mean length of the fibres in the walls could be greater than 10 cm or 50 cm. The fibres are laid up in a way that strengthens the tub frame against the stresses expected to be imposed on it in use. Typically most parts of the walls will contain multiple layers of reinforcing fibre. In each tube element of the tub frame the fibres may run generally longitudinally and/or generally circumferentially. Fibres running generally circumferentially are known as hoop fibres.

Figure 2:
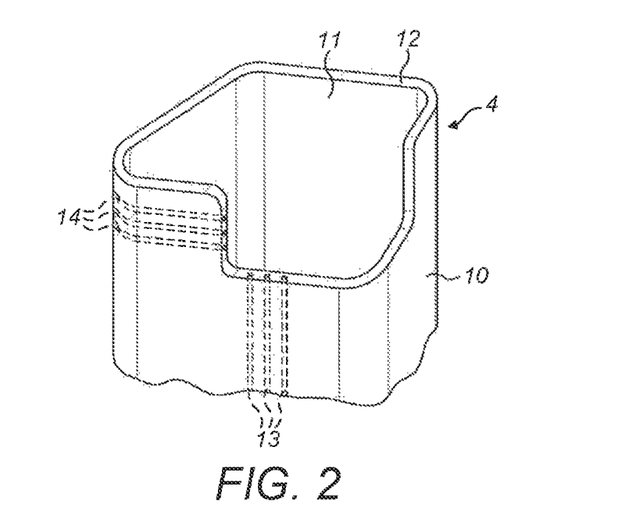
FIG. 2 shows a cross-section through part of an A-pillar of the tub of FIG. 1.

FIG. 2 shows a cut-away view of an A-pillar 4 of the tub frame. The A-pillar is in the form of a tube having an outer surface 10 and a hollow interior 11. The wall of the tube is formed of a matrix material indicated at 12. Longitudinal fibres are indicated at 13, and hoop fibres are indicated at 14. The longitudinal fibres and the hoop fibres could overlap.

The tub frame as shown in FIGS. 1 and 2 is convenient for manufacture as a high strength element by RTM because it does not have any detailed surface features. As a result, when the carbon fibres are being laid up in the mould in preparation for injection of the resin, it is relatively easy to arrange that long carbon fibres can be included substantially throughout the structure of the tub frame.

The tub frame is preferably formed by RTM: that is by the positioning of reinforcing fibres in a mould, followed by the injection of liquid resin into the mould, followed by the curing of the resin to rigidify the moulded component. A vacuum may be drawn in the mould before the resin is injected, and the vacuum may then pull the resin into the mould. The mould may be heated to promote curing of the resin. Alternative methods may be used to form the tub frame. For example it could be formed by laying up mats of reinforcing fibre that have been pre-impregnated with resin (prepreg) and then curing the resin.

Figure 3A:
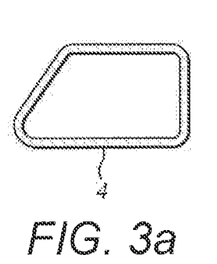
FIG. 3A-C shows steps in overmoulding parts on to the A-pillar of the tub of FIG. 1.
Figures 3B, 3C:
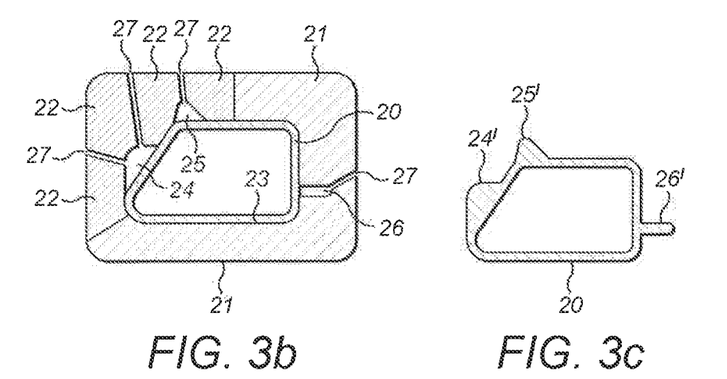

FIG. 3 shows stages in the subsequent processing of the tub frame to form a final tub for a vehicle.

FIG. 3A is a cross-section through the A-pillar 4 of the tub frame, after it has been formed and cured.

The tub frame is then inserted into a mould whose mould cavity accommodates the tub frame but defines volumes around at least some parts of the tub frame. FIG. 3B illustrates a cross-section through the A-pillar and the mould once the tub frame has been inserted in the mould. The A-pillar is shown at 20. The mould is composed of a first mould body 21 and a second mould body 22, which abut each other and define the mould cavity between them. The entire mould could be composed of several such mould bodies, which can be assembled to form the mould and disassembled to allow the tub frame to be placed in and released from the mould. The mould encircles the A-pillar. In some places the surface of the mould cavity defined by the mould bodies lies adjacent to the exterior surface of the tub frame, as indicated at 23. In other places the surface of the mould cavity defines a free volume between that surface and the exterior surface of the tub frame, as indicated at 24, 25, 26.

Prior to being contacted with the SMC material the tub is fully cured and rigid.

Next SMC material is loaded into the mould cavity. In one approach, the SMC material may be in the form of a semi-rigid body comprising resin and short fibres. That body can be loaded together with the tub frame into the mould cavity. Then the mould can be closed. In this approach the closing of the mould shapes the SMC body to the mould cavity and forces the SMC body into intimate contact with the adjacent surfaces of the tub frame. The pressure exerted as the mould closes causes the SMC body to flow plastically so as to fill the volumes 24, 25, 26 between the exterior surface of the tub frame and the surface of the mould cavity. In this approach the ports 27 can be omitted, or can be used to draw a vacuum in the mould cavity after the mould is closed. In another approach the SMC material may initially be in a liquid form comprising a mixture of liquid resin and short fibres. Once the mould is closed with the tub in place within it the liquid SMC material can be loaded into the mould be injecting it through multiple ports 27 extending from the exterior of the mould bodies to the volumes 24, 25, 26. Before the SMC material is injected the mould cavity may be evacuated so as to reduce the chance of air being trapped in the mould when the SMC materials is injected.

Figure 4A:
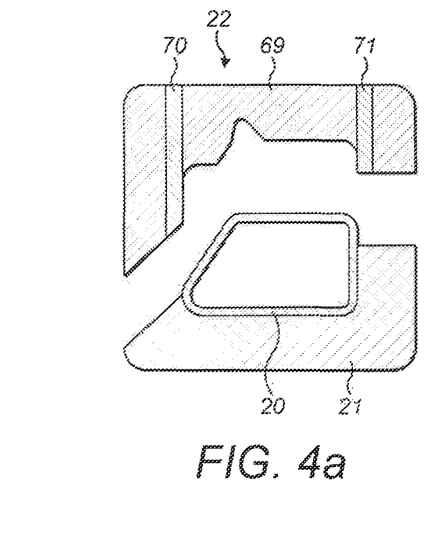
FIG. 4A-C shows one set of steps in the closing of the mould around the A-pillar of the tub of FIG. 1.
Figure 4B:
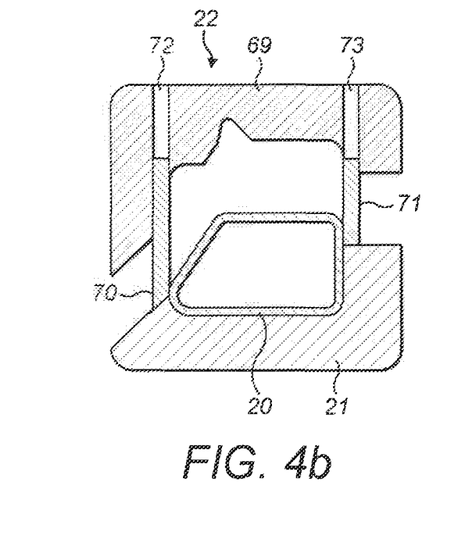

FIG. 4 shows a configuration of the mould bodies and one set of steps of closing the mould bodies around the A-pillar 20. At least one of the mould bodies 22 may comprise a main mould body 69 and at least one movable member 70, 71. The movable member 70, 71 may be capable of sliding relative to the main mould body 69. The sliding of movable member 70, 71 may be undertaken by one or more actuators (not shown) that may form part of the general moulding apparatus used to control the moulding process. As shown in FIGS. 4A and 4B, the moveable members maybe be capable of sliding relative to the main mould body 69 between an extended position (as shown in FIG. 4B) and a retracted position (as shown in FIG. 4A). The moveable members may be referred to as mould sliders 70, 71. The mould bodies may be referred to as a tool part and so the moveable members may be referred to as tool sliders 70, 71.

Figure 4C:
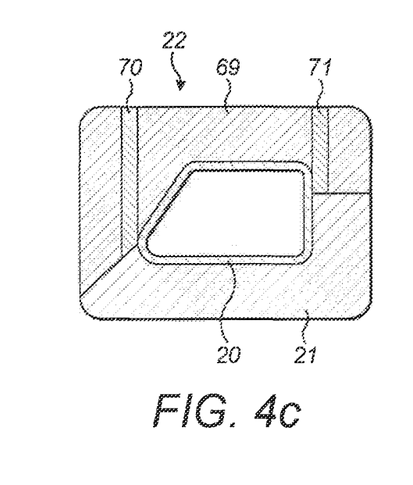

The position within the mould body 22 of the or each moveable member 70, 71 may be selected so that the moveable member(s) engage with the A-pillar 20 prior to the closing of the main mould body 69 against the other mould bodies that surround the A-pillar 20. In this configuration, the moveable member(s) 70, 71 secure the A-pillar within the first mould body 21 prior to the closure of the main mould body 69 of second mould body 22 against the first mould body 21. The securing of the A-pillar may prevent any SMC material from flowing around the A-pillar 20 prior to the closure of the main mould body 69. As shown in FIG. 4, first mould body 21 closes against second mould body 22. As shown between FIGS. 4B and 4C, moveable members are received in openings 72, 73 within the main mould body as the second mould body 22. The openings 72, 73 are configured to receive moveable member(s) 70, 71 as the moveable members slide between the extended position and the retracted position relative to the main mould body 69. The volumes are not shown in FIG. 4C for clarity but also because they may not be present in another part of the mould.

Figure 5:
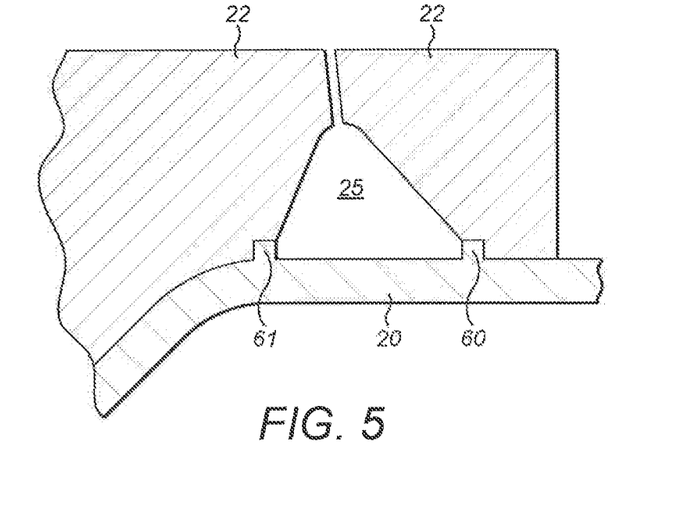
FIG. 5 shows a close up view of one step in overmoulding parts on to the A-pillar of the tub of FIG. 1.

FIG. 5 shows a close-up view of part of the cross-section through the A-pillar and the mould once the tub frame has been inserted in the mould. As in FIG. 3 the A-pillar is shown at 20. Only part of the first mould body 21 is shown in FIG. 5, but it will be appreciated that the following description could equally be applied to the rest of the first mould body 21 not shown in FIG. 5. As described above in relation to FIG. 3B, in particular places the surface of the mould cavity defines a free volume between that surface and the exterior surface of the tub frame as indicated at 25 in FIG. 5 and at 24, 25, 26 in FIG. 3B.

As shown in the close-up view of FIG. 5, the exterior surface of the tub frame comprises one or more projections 60, 61 extending away from the exterior surface of the tub frame. These projections 60, 61 have been formed during the moulding process of the tub frame. The projections may comprise both resin and reinforcing fibres, or may only be composed of resin. The projections are configured to act as a barrier to the flow of the SMC material. In this way, the SMC material can be contained within the region of the exterior surface of the tub frame delimited by the one or more projections. As shown in FIG. 5, a projection may be located at the edge of a free volume defined between the surface of the mould cavity and the exterior surface of the tub frame. Stated in a different manner, a projection may be located where the surface of the mould cavity starts being in an adjacent position to the exterior surface of the tub frame. The projection assists in defining the outer edge of a region of SMC material that is to be cured to the exterior surface of the tub frame. The projection may be present along the whole edge of the free volume or it may be present along only part of the edge of the free volume. The length and configuration of the projection may be selected depending on the profile of the exterior surface of the tub frame and thus the likelihood of leakage of SMC material from a particular free volume. Each projection may form a resin barrier to restrict the flow of SMC material.

The mould body may be shaped so as to comprise complimentary regions in the surface of the mould cavity that lie adjacent the exterior surface of the projections. In this way, the complimentary regions in the surface of the mould cavity can seal against the exterior surface of the projections to limit or prevent flow of SMC material out of the free volume. The mould body surface, in the complimentary regions, and the surface of the projections may be controlled to tight tolerances so as to ensure the necessary engagement between the mould body and the exterior surface of the tub frame is achieved to prevent overspill of SMC material.

Once the SMC material is in place in the mould volume it is cured (e.g. through the application of heat) and the resulting component is removed from the mould. FIG. 3C shows the situation after the SMC material has been cured and the resulting component has been removed from the mould. The free volumes 24, 25, 26 have been filled with SMC material as shown at 24', 25', 26' which is now integral with the material of the tub frame 20.

The SMC material is a liquid matrix precursor (e.g. curable resin) which contains a multiplicity of short reinforcing fibres.

It is preferred that substantially all the short reinforcing fibres are free from each other so that the SMC material can flow readily into the mould cavity. The fibres are preferably distributed substantially uniformly in the liquid precursor. The fibres may be orientated randomly, or there may be preferential orientation of the fibres due, for example, to the flow behaviour of the liquid precursor when it is compressed by the closing of the mould or is injected into the mould. The proportion of fibres contained in the SMC material will depend on the properties of the materials and the desired application, but it could be between 40% and 60% in volume fraction. The mean length of the short fibres is preferably in the range from 10 mm to 60 mm. The liquid matrix precursor could be a resin, for example an epoxy, nylon, polyester resin or vinyl ester resin. The fibres could be fibres of a material having higher tensile strength than the cured matrix material. The fibres could, for example, be carbon fibre, glass fibre or fibres of a polymer such as an aramid.

Once the SMC material has been loaded or injected into the mould cavity the mould is heated to cause the matrix precursor to cure and solidify, e.g. by cross-linking. Then the mould is opened and the solid moulded final tub is removed.

Figure 6:
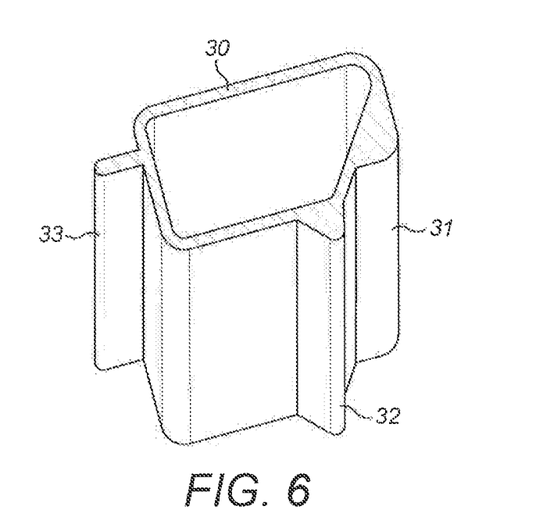
FIG. 6 shows part of an overmoulded A-pillar.

FIG. 6 illustrates some examples of the structures that can be overmoulded onto the pre-cured tub frame in this way. FIG. 6 shows a cut-away partial view of an A-pillar for an automobile. A part of an initially formed tub frame, for example made by RTM, is indicated at 30. Additional elements 31, 32, 33 are formed from SMC material overmoulded on to the initially formed tub part. The elements 31 and 32 together with the tub frame define a seat for windscreen glass. Element 33 is a rib that protrudes from the initially moulded tub frame. The rib can serve as an attachment for a rubber door sealing strip which can clip around the rib. Other examples of elements that could be made by the SMC overmoulding steps include attachment pads or brackets for components such as hinges; housings for components such as mirrors, lights or cameras; lugs or sockets to which other parts can be clipped; and other functional or cosmetic detail parts. One advantage of the process described above is that the relatively expensive RTM process can be used for making the key load-bearing parts of the final component, but the detailed parts of the same component can be made by flow moulding.

Elements such as flanges 31, 32 and rib 33 could alternatively be manufactured separately from the tub frame and then attached to the tub frame with adhesive or with screws or bolts. However, by overmoulding the additional elements, as described above, a much greater degree of adhesion can be achieved between the additional elements and the tub frame. In that way the overmoulded elements can contribute significantly to the strength of the final tub. In designing the tub, calculations for operational or crash loads on structural elements of the tub, including crash structures, can take into account the contribution to strength provided by the overmoulded elements. Thus the overmoulded elements can be structural parts of the vehicle, contributing substantially to the strength of the final tub. Examples of crash protection structures include forward and rear beams extending from a passenger cell to forward and rear bumpers respectively, side beams for resisting sideways ingress into a passenger cell and roll-over protection systems such as A-pillars and roll-over hoops or struts.

The overmoulded elements illustrated in FIG. 6 run along the longitudinal extent of the A-pillar. In that way they can help to contribute to the bending strength of the A-pillar.

The adhesion of the overmoulded elements to the tub frame can be enhanced if the matrix of the overmoulded elements is of the same or substantially the same material as the matrix of the matrix of the tub frame. For example, they could both be of the same structural polymer or of polymers having substantially the same coefficient of thermal expansion once cured.

Figure 7:
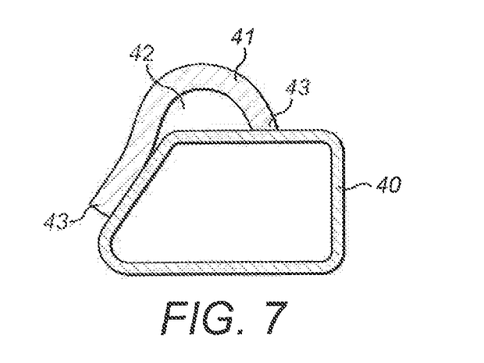
FIG. 7 illustrates an alternative process for overmoulding an A-pillar.

FIG. 7 shows an alternative arrangement for overmoulding on to the previously rigidified tub frame 40. The mould 41 that defines the mould cavity 42 for the overmoulding process does not encircle the tub. Instead the rim 43 of the mould cavity abuts the tub.

In the arrangements of FIGS. 3 and 7 the mould and the tub, or part of it, can be surrounded by a vacuum bag and a vacuum drawn therein during the step of loading the overmould material, closing the mould and/or injecting the overmould material.

In the illustrated examples the SMC material is moulded against the exterior surface of a region of the tub frame that is hollow. That means that the material of the tub against which the SMC material exerts pressure (e.g. when it is shaped during closing of the mould) has a void on its opposite face to the SMC material. The mould does not directly press against that opposite face because it is enclosed by the tub body. When the mould is not present directly behind the part of the tub body on which the SMC material is pressing there is a risk that the tub body will flex during the moulding process. This raises a number of difficulties. First, it is more difficult to achieve a seal between the mould and the tub structure to prevent the SMC material from spreading outside the mould. Second, it is possible that the tub structure might be permanently deformed, either through overloading or because the SMC material sets with the hollow tub part in a deformed condition.

It has been found that the performance of the final tub structure is improved if the mould 21, 22, 41 used to form the SMC structure is heated to a temperature at which the matrix material of the tub frame will soften. That temperature will depend on the nature of the matrix material, but it may be above the glass transition temperature ($T_g$) of the matrix material. The temperature to which the mould body/bodies is/are heated is preferably not more than 10° C. or 20° C. above $T_g$ of the matrix material. Instead of this, or in addition, the SMC material may be heated to such a temperature during the process of curing it. It is believed that elevating the temperature of the mould and/or the SMC material in this way can help to relieve stress in the tub frame that could otherwise arise from the overmoulding of the SMC material. Furthermore, when the rim of the mould cavity abuts the tub frame as shown in FIG. 7, in order for the mould cavity to be fully closed and thereby prevent leakage of SMC material from the mould cavity when it is compressed, the rim 43 must seal against the surface of the previously rigidified tub. This sealing can be assisted by heating the mould 41 to a temperature at which the matrix material of the tub 40 will soften. Then the mould can be pressed somewhat into the tub, conforming the tub to the rim 43 of the mould 41 and permitting a better seal between the two. A good seal is particularly significant since the SMC material has relatively low viscosity, especially at elevated temperatures.

Sealing of the mould 41 against the tub frame 40 can also be enhanced by providing significant hoop fibres in the tub frame at the region where the mould 41 is to seal against it. For example, those sections of reinforcing fibre that are orientated at 45° or more to the principal longitudinal axis of the hollow part of the tub that is being overmoulded may constitute more than 10% or more than 15% or more than 20% of the total length of reinforcing fibres in that hollow part of the tub. Those sections of reinforcing fibre that are orientated at 45° or less to a plane transverse to the extent of the cavity running along the hollow part of the tub that is being overmoulded may constitute more than 10% or more than 15% or more than 20% of the total length of reinforcing fibres in that hollow part of the tub. It has been found that when the mould cavity is closed so as to deform the already-loaded SMC material, or SMC material is injected into the mould cavity, there can be a tendency for the tub frame member, being hollow, to deform inwards. That deformation can break the seal of the mould against the tub frame member, allowing SMC material to leak from the mould cavity. The tub frame can be strengthened against that deformation by means of hoop fibres in the region where the mould 41 is to be applied.

Some commercially available SMC compounds contain a release agent to help the cured SMC component to be released from a mould. If such SMC compounds are used to overmould the tub frame then it can be advantageous to take additional steps to improve adhesion between the SMC overmould and the tub frame. One way to achieve that is to coat the tub frame with adhesive in the region where the SMC component is to be overmoulded before the tub frame is located in or against the mould for the SMC component. The adhesive could be applied as a liquid to the appropriate region. More conveniently it could be applied as a sheet. For example, the adhesive could initially be provided on a backing sheet which is coated with a release layer and an adhesive layer over the release layer. Then the adhesive side of the sheet can be located against the appropriate region and the backing sheet removed, leaving the adhesive stuck to the tub frame.

Any suitable material could be used for the matrix material of each of the initially formed element and the matrix material of the overmoulded element. Each matrix material could be a polymer, for example, an epoxy, a nylon, a polyester or a vinyl ester. The matrix materials could be different or the same. Preferably the matrix material of the initially formed element is capable of softening to a limited extent at a temperature suitable for curing the matrix material of the overmoulded element. For example, a suitable temperature for curing the matrix material of the overmoulded element may be in the range from the $T_g$ of the matrix material to 10° C. or 20° C. above that $T_g$. Any suitable material could be used for the reinforcing fibres of each of the initially formed element and the reinforcing fibres of the overmoulded element. Each fibre material could, for example, be carbon fibre, glass fibre or a polymer fibre such as an aramid fibre. The fibre materials could be different or the same.

The initially formed element can be a continuous fibre element. That is, it can be formed of fibres having a length greater than 10 cm, or greater than 20 cm, or greater than 30 cm, or greater than 50 cm, or greater than 1 m.

In the examples discussed above, the initially formed element is a vehicle tub. The initially formed element could be for any appropriate purpose: for example it could be a vehicle seat, a bicycle frame, a vehicle suspension element or a casing for a mobile phone. More than one initially formed element could be inserted into the mould for the overmoulding process, and they could be joined together by the overmould. The initially formed element could be formed by RTM or by any other suitable process.

Figure 8:
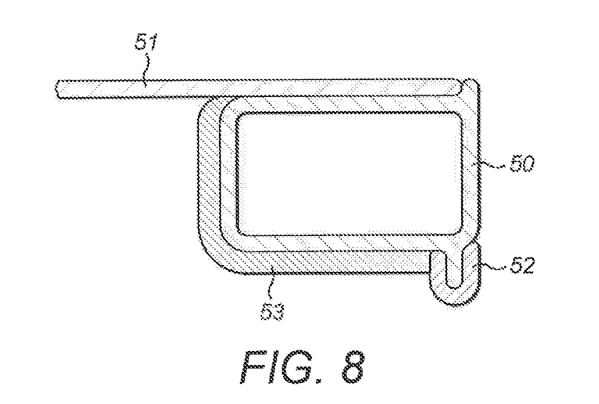
FIG. 8 shows a plan cross-section of an A-pillar.

In a normal automobile the surfaces of the A-pillar that are exposed inside the cabin are covered in interior trim and energy absorbing materials in order to reduce the damage that might result from an occupant's head impacting the A-pillar. FIG. 8 shows a plan cross-section of such an A-pillar in a vehicle. The structural wall of the A-pillar is shown at 50. A glass windscreen 51 is adhered to the front surface of the A-pillar. A weather strip or interior trim seal 52 seals the A-pillar against the door of the vehicle when the door (not shown) is closed. The rear-facing and interior side surfaces of the A-pillar are covered with a cosmetic and cushioning cover layer 53. It has been identified that in normal crash modelling the standard headform of an occupant of the vehicle cannot impact the sideways-facing part of a typical A-pillar. That is principally due to the fact that (even if the headform were to be able to reach the A-pillar bearing in mind the occupant restraint systems such as seat-belts and airbags) the curvature of the headform is sufficiently large as to prevent the headform from sufficiently entering the zone defined by the windscreen and the side of the A-pillar to make contact with the side surface.

Figure 9:
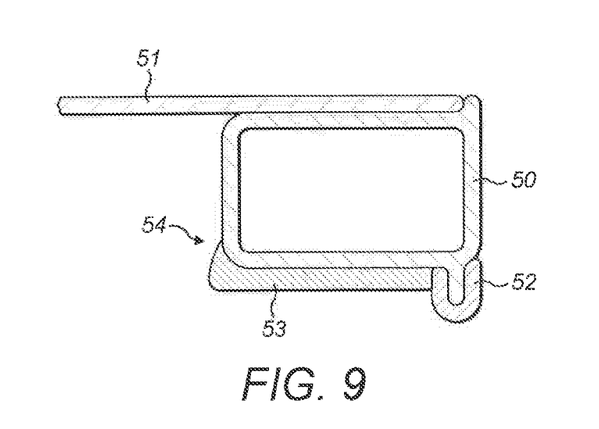
FIG. 9 shows an alternative design of A-pillar.

FIG. 9 shows an alternative design of A-pillar, in which like parts are indicated as for FIG. 8. In the A-pillar of FIG. 9 the majority of the interior side surface of the A-pillar is not covered by the cover layer 53. The cover layer extends over the rearward-facing part of the A-pillar but stops at or near the transition to the sideways-facing interior surface of the A-pillar, as indicated at 54. This leaves the structural component 50 of the A-pillar exposed in the region between 54 and the windscreen 51. This has a number of advantages. First, it improves visibility for the driver because the apparent width of the A-pillar is reduced. Second, it reduces the weight of the vehicle. Finally, if the structural component of the A-pillar is formed of an attractive material such as carbon fibre it can produce a pleasing visual effect.

The cover layer may cover extend only over the rearward-facing part of the A-pillar, or it may extend a little on to the lateral surface, as shown in FIG. 9. It is preferred that the majority of the side surface of the structural element of the A-pillar, most preferably at least the forward 50% of the structural element of the A-pillar is free from covering. It is preferred that over the height of the A-pillar all or the majority of the regions of the sideways-facing interior surface of the A-pillar nearest to the windscreen are free from the cover layer. For example, considering the portions of that surface that constitute the nearest 25% or nearest 10% of that surface to the windscreen, preferably all or the majority or more than 75% or more than 90% of those portions are free from the cover layer. Preferably the interior sideways-facing surface of the A-pillar is entirely free from the cover layer along its edge bordering the windscreen over either the upper 50% of the A-pillar or the upper 80% of the A-pillar or over the whole of the length of the A-pillar. The covering could be a cushioning covering such as a foam or rubber and/or a cosmetic covering such as a cloth or leather. The exposed side surface of the A-pillar may have an integral coating such as a varnish or paint to protect it from degradation. The thickness of such a coating is preferably less than 1 mm or less than 0.5 mm, whereas the thickness of the cosmetic or cushioning covering could be greater than 1 mm, greater than 2 mm or greater than 5 mm.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A method for forming a composite component, comprising:
   locating a rigid composite element comprising a matrix interspersed with long fibre reinforcement in a mould that is shaped to define a cavity about the rigid element;
   loading a material comprising a matrix precursor interspersed with short fibre reinforcement into the cavity; and
   curing the matrix precursor;
   wherein a first part of the mould is shaped to fit to the contours of the rigid composite element and a second part of the mould is shaped to define the cavity around part of the rigid composite element, the rigid composite element comprising at least one projection integrally formed with the rigid composite element; and
   wherein the step of locating comprises locating the at least one projection at an edge of the cavity of the second part of the mould, where the mould is shaped to fit against the contours of the surfaces of the at least one projection facing away from the cavity such that the mould seals against the at least one projection to substantially inhibit flow of the matrix precursor out of the cavity.

2. A method as claimed in claim 1, wherein a first part of the mould is shaped to fit to the contours of the rigid element and a second part of the mould is shaped to define the cavity around the rigid element, and the step of locating comprises closing the mould against the rigid element without substantially altering the shape of the rigid element.

3. A method as claimed in claim 1, wherein the rigid element is hollow in the region adjacent to the cavity.

4. A method as claimed in claim 1, wherein the method comprises, prior to the loading step, heating the mould to a temperature at which the matrix of the rigid element will soften.

5. A method as claimed in claim 4, wherein the temperature to which the mould is heated is between the glass transition temperature of the matrix of the rigid element and 20° C. above that temperature.

6. A method as claimed in claim 4, wherein the rigid element is hollow in the region adjacent the cavity, and wherein the step of closing the mould comprises indenting the mould into the surface of the rigid element so as to seal the cavity.

7. A method as claimed in claim 1, wherein the mould comprises a first part of the mould and a second part of the mould, the first part of the mould comprising a mould body and at least one mould slider moveable between an extended position and a retracted position relative to the mould body, and the step of locating comprises closing the mould against the rigid element by: bringing the at least one mould slider, in the extended position, into contact with a second part of the mould, closing the first part of the mould and the second part of the mould around the rigid composite element so that the mould slider moves between the extended position and the retracted position.

8. A method as claimed in claim 7, wherein the step of bringing the at least one mould slider into contact with a second part of the mould comprises securing the rigid composite element in the second part of the mould by the at least one mould slider.

9. A method as claimed in claim 1, wherein the projection extends away from the exterior surface of the rigid composite element.

10. A method as claimed in claim 1, wherein the method comprises, heating the said material to a temperature at which the matrix of the rigid element will soften.

11. A method as claimed in claim 10, wherein the temperature to which the said material is heated is between the glass transition temperature of the matrix of the rigid element and 20° C. above that temperature.

12. A method as claimed in claim 10, wherein the method comprises heating the said material to the said temperature after loading it into the cavity.

13. A method as claimed in claim 10, wherein the method comprises heating the said material to the said temperature before loading it into the cavity.

14. A method as claimed in claim 1, wherein the long fibre reinforcement comprises fibres longer than 50 cm.

15. A method as claimed in claim 1, wherein the said material comprises fibres shorter than 10 cm.

16. A method as claimed in claim 1, wherein the said material comprises no fibres longer than 10 cm.

17. A method as claimed in claim 1, comprising the step of forming the rigid composite element by resin transfer moulding.

18. A method as claimed in claim 1, wherein the rigid composite element is a tub for a vehicle.

19. A method as claimed in claim 18, wherein the cavity is adjacent to a portion of the tub forming part of a crash structure.

20. A method as claimed in claim 19, wherein the material injected into the cavity defines a structural feature of the crash structure.

21. A method as claimed in claim 18, wherein the cavity is adjacent to an A-pillar of the tub.

22. A method as claimed in claim 21, wherein the material injected into the cavity defines a feature running lengthwise along the A-pillar.

23. A method as claimed in claim 22, wherein the feature is one of a flange for carrying a door seal and a flange for bonding glass to.

24. A method as claimed in claim 1, comprising, prior to the step of loading, coating at least a part of the surface of the rigid element with an adhesive, wherein that part of the surface is overlain by the cavity.

25. A method as claimed in claim 24, wherein the adhesive is applied as a peelable film.

* * * * *